UNITED STATES PATENT OFFICE.

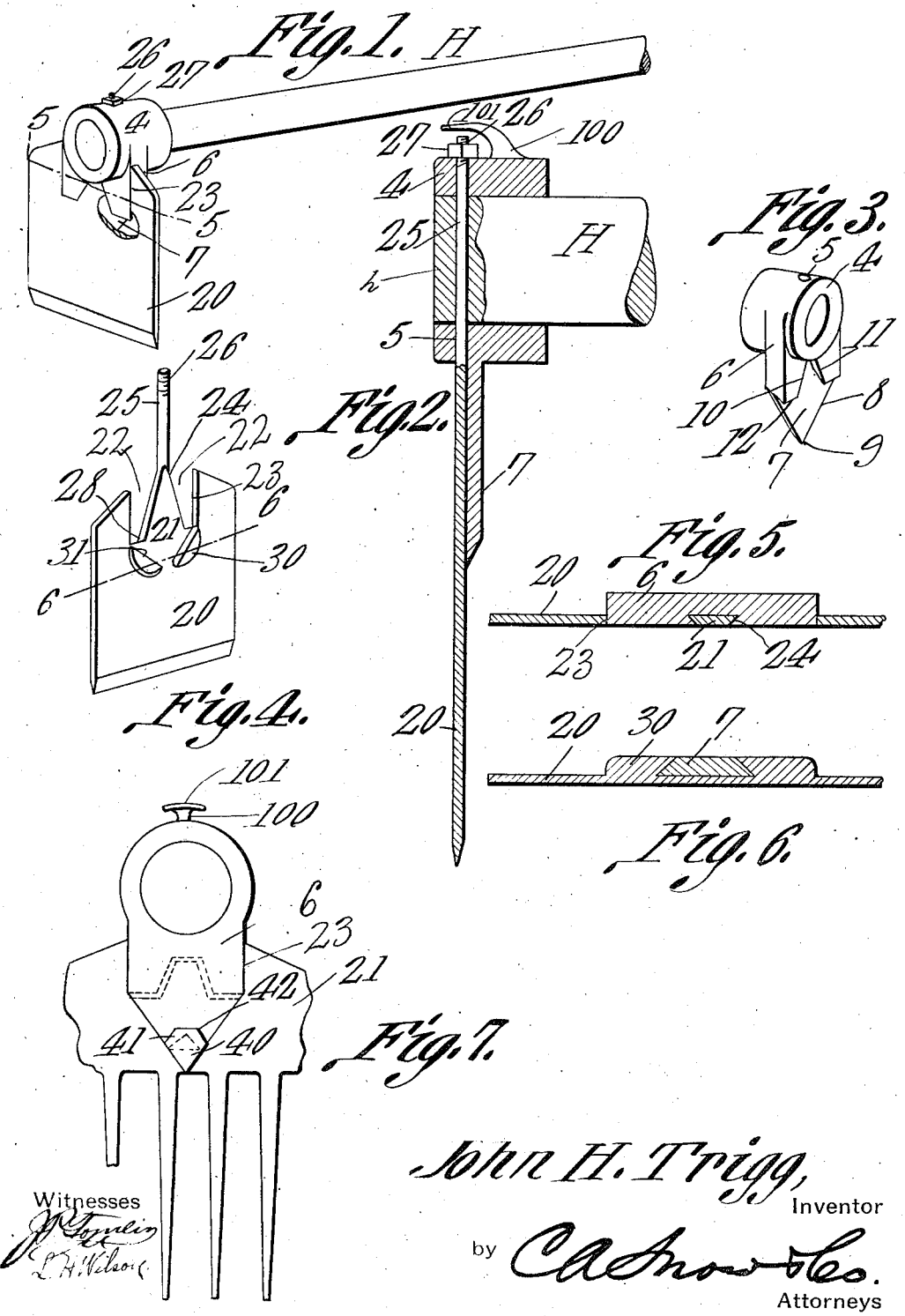

JOHN H. TRIGG, OF CORINTH, KENTUCKY.

HOE.

996,686.

Specification of Letters Patent. Patented July 4, 1911.

Application filed March 7, 1911. Serial No. 612,775.

*To all whom it may concern:*

Be it known that I, JOHN H. TRIGG, a citizen of the United States, residing at Corinth, in the county of Grant and State of Kentucky, have invented a new and useful Hoe, of which the following is a specification.

This invention relates to hoes, and more especially to those having interchangeable blades; and the object of the same is to produce an improved detachable connection between the blade and the handle, which connection serves also as a handle fastening. This object is accomplished by the construction hereinafter more fully described and claimed, and as shown in the drawings, wherein—

Figure 1 is a general perspective view of this implement ready for use. Fig. 2 is a vertical central section thereof. Fig. 3 is a perspective detail of the eye member as viewed from its outer side. Fig. 4 is a perspective view of the blade member as seen from its inner side. Figs. 5 and 6 are sections on the line 5—5 and 6—6 in Figs. 1 and 4 respectively. Fig. 7 is an elevation of a slight modification.

In the drawings the letter H designates the handle which is preferably of wood, and my invention contemplates no change in this handle excepting to bore a hole $h$ through it near its outer end. On said end is mounted the eye member best seen alone in Fig. 3, which member comprises a tubular sleeve 4 and an integral spur projecting downward from the same near its outer end. The sleeve has a bore into which the handle H may be inserted as best seen in Fig. 2, and at right angles to this bore it has a perforation 5 for a purpose to appear below.
The spur is by preference formed integral with the metal of the sleeve, and is rather thick at its upper portion where it merges into said sleeve as seen at 6 and is by preference of rectangular cross sectional contour as seen in Fig. 5, while its lower portion 7 is cut away on its outer face for about half the thickness of the upper portion so that it will be thinner, and in contour it is V-shaped in elevation because its sides 8 converge to a sharp edge or point 9. Over this point and in the thicker portion 6 is formed an inverted V-shaped notch 10 whose side walls are undercut or beveled as at 11, as also by preference are the shoulders 12 between the thicker portion 6 and the lower portion 7, whereas the side edges 8 of said lower portion 7 are by preference beveled in the opposite direction.

The blade member best seen alone in Fig. 4, comprises a body 20 which we may call the tool proper, being shown as a hoe blade in that view and as a rake in Fig. 7 although it will be clearly understood that a number of implements or tools may be provided, each having the same fastening means as those to be next described—hence where I speak herein of this device as a hoe it is to be understood that I use the term broadly as covering any equivalent agricultural implement. It is essential that the upper portion of the body 20 shall be a flat blade as seen at 21, and in its upper edge are cut two notches 22 each of which preferably has a straight vertical outer wall 23 adapted to stand against the side edges of the thicker portion 6 as seen in Fig. 1, and an inclined and transversely beveled inner wall 24 adapted to engage the undercut edge 11, the convergence of these walls being such that the material of the blade 21 between them occupies and completely fills the notch 10 when the parts are assembled. From the apex of this portion of the blade, a rod 25 projects upward and is by preference formed integral with the material of the tool, the length of this rod being such that it will pass through the perforation 5 in the sleeve 4 and through the hole $h$ in the handle H referred to above, and will project upward beyond the top of the sleeve where it is threaded as at 26 to receive a nut 27 for holding the parts together. This detail, therefore, serves not only to hold the metal parts of this hoe connected with each other, but also as a handle fastening to hold within the sleeve 4 the handle H, and it will be impossible for the latter to become loose so long as the nut 27 is not removed. The lower ends of the notches 22 are beveled as at 28 to fit the undercut shoulders 12. On the inner side or face of the blade 21 are formed lugs 30 whose adjacent edges diverge upward and are undercut as at 31 to conform with the divergence and beveling of the sides 8 at the lower portion 7 of the spur. By preference these lugs are formed integral with the body 20 of the blade 21, and in fact the entire blade and rod 25 can be made of one piece with its lower or cutting edge (or its teeth as shown in Fig. 7) suitably tempered to perform the work which the implement will be called upon to do. As a modification I may omit the lugs 30 shown in Fig. 4 and substitute a single lug 40 with undercut upper edges 41, but in this case I shall provide a notch 42 in the extremity of the lower portion 7 of the first described member and the edges of this notch will of course be beveled to correspond with the undercut edges of the lugs 40.

It is to be understood that this implement is furnished to the consumer with one handle, one sleeve, and a number of tools comprising a body shaped to perform what work he desires and including a blade having the fastening means described and which coöperates with the fastening means on the spur portion of the sleeve. In order to assemble these various parts, the user inserts the threaded end 26 of the rod 25 upward into the perforation 5 in the sleeve 4, and then turning the body 20 so that the blade 21 lies against the face of the lower portion 7 of the spur, he raises the entire blade until the undercut edges of the lugs 30 (or the undercut edge of the lug 40) engage said lower portion, at which time the notches 22 will engage the upper portion 6 of said spur, and the latter will be held as one with the tool. Meanwhile the rod 25 has passed through the hole in the handle H and upward through the upper end of the perforation 5, and the final act is to apply and tighten up the nut 27, thereby drawing the parts still more firmly together and of course preventing the dislocation of the handle as long as the nut is in place. It will be found that the various points at which the two metallic members make close contact with each other will not only give rigidity to the entire implement and resist the strains which are brought upon it by its constant use, but will prevent dirt and other particles from entering between the meeting faces of the metallic members and rusting therein.

As above intimated, I do not confine myself to the shape of the tool, nor to the sizes and materials of parts.

Another modification illustrated in Fig. 7, and also in Fig. 2 in section, consists of a nut protector which I preferably employ and which may be formed integral with or attached in any way to the sleeve 4. As herein shown it consists of a shank 100 rising from said sleeve and a plate 101 curved over the upper end of the opening through this sleeve through which the rod 25 is to pass, and the plate stands sufficiently high above the sleeve to permit the insertion beneath of a wrench so as to turn the nut 27. In implements of this character it is well known that the soil and mud often get onto the nut and into the threads 26 to such an extent that the nut cannot be removed when desired, and I have found that a protector of this kind is extremely serviceable at this point.

What is claimed is:

1. In a hoe, the combination with the handle having a hole through it near its outer end; of a metallic sleeve adapted to fit upon said handle and having a perforation adapted to register with the hole, and a spur projecting integrally and radially from said sleeve and having a thicker portion and a thinner portion; and a tool comprising a body, a blade shaped to detachably engage the thicker and thinner portions of said sleeve, a rod projecting integrally from said blade and in the plane thereof and adapted to extend through the perforation in the sleeve and the hole in the handle, and a nut removably engaging the upper extremity of said rod.

2. In a hoe, the combination with the sleeve member having an integral spur projecting therefrom and including a thicker portion provided with a notch having undercut walls and a thinner tapered portion having its edges beveled opposite to said undercut walls; of a tool member comprising a body, a blade rising therefrom and having notches with converging inner walls beveled to correspond with the undercut edges of the notch in the other member, lugs on said blade having undercut edges adapted to fit the sides of said tapered portion of the other member, and means for drawing this tool member into contact with the other member.

3. In a hoe, the combination with the sleeve member having an integral spur projecting therefrom and including a thicker portion provided with a notch having undercut walls and a thinner tapered portion having its edges beveled opposite to said undercut walls; of a tool member comprising a body, a blade rising therefrom and having notches with converging inner walls beveled to correspond with the undercut edges of the notch in the other member, lugs on said blade having undercut edges adapted to fit the sides of said tapered portion of the other member, a rod rising from and in line with the blade between said inner walls of the notches, and means for detachably connecting this rod with said sleeve.

In testimony that I claim the foregoing as my own, I have hereto affixed my signature in the presence of two witnesses.

JOHN H. TRIGG.

Witnesses:
 FRANK SHELTON,
 T. J. DAVIS.